United States Patent [19]

Kazama

[11] Patent Number: 5,041,820
[45] Date of Patent: Aug. 20, 1991

[54] CURSOR DEVICE FOR A CAPACITIVE COUPLING TABLET

[75] Inventor: Mitsuo Kazama, Soka, Japan

[73] Assignee: Pentel Kabushiki Kaisha, Japan

[21] Appl. No.: 100,749

[22] Filed: Sep. 24, 1987

[30] Foreign Application Priority Data

Sep. 25, 1986 [JP] Japan .................. 61-147088

[51] Int. Cl.⁵ .................................................. G09G 5/08
[52] U.S. Cl. ........................................ 340/710; 178/18
[58] Field of Search ................. 340/706, 709, 710; 178/18, 19, 20

[56] References Cited

U.S. PATENT DOCUMENTS

| | | | |
|---|---|---|---|
| 4,194,084 | 3/1980 | Hetzel | 178/19 |
| 4,523,654 | 6/1985 | Quayle et al. | 178/19 |
| 4,600,807 | 7/1986 | Kable | 178/19 |
| 4,639,547 | 1/1987 | Jacob-Grinschgl et al. | 178/19 |
| 4,705,919 | 11/1987 | Dhawan | 178/19 |

FOREIGN PATENT DOCUMENTS 0116026 6/1985 Japan ............................ 340/710

*Primary Examiner*—Alvin E. Oberley
*Assistant Examiner*—Richard Hjerpe
*Attorney, Agent, or Firm*—Bruce L. Adams; Van C. Wilks

[57] ABSTRACT

A cursor device for a capacitive coupling tablet used as a digitizer for inputting a figure or pattern. An index indicative of a coordinate position on a tablet to be input is displayed on a pane mounted on a window of a housing, and on the side opposite the pane are carried a detection electrode corresponding to the index and a signal transmission wire extending from the electrode. The detection electrode is capacitively coupled to a few conductors adjacent to each other within the table to detect pulses having a level related to the distance from these conductors. In this case, the level of the pulse detected from the conductors present at a position crossed to the signal transmission wire tends to relatively lower, and therefore, a shield layer distributed around the electrode is formed on the pane to solve such inconveniences.

18 Claims, 3 Drawing Sheets

CURSOR DEVICE FOR A CAPACITIVE COUPLING TABLET

FIELD OF THE INVENTION

The present invention relates to a digitizer for producing a digital signal corresponding to a coordinate position on a tablet, and more specifically to a probe used together with a capacitive coupling tablet and having a cursor for indicating a coordinate position to be formed into a digital signal on the tablet.

DESCRIPTION OF PRIOR ART

U.S. Pat. No. 3,567,859 issued Mar. 2, 1971 discloses the first capacitive coupling tablet device which is applied as a figure input device. This device includes two groups of conductors arranged in a two-dimensional matrix fashion spaced apart from each other, each of said groups of conductors being sequentially energized pulsewise, and comprises a tablet and a probe which, in a suitable coordinate position on the tablet, is capacitively coupled to the each group of conductors closest to the coordinate position to detect pulses from said conductors.

Thereafter, the principle of the capacitive coupling tablet proposed as a figure input device was also applied to a keyboard device which inputs characters, particularly characters having many kinds such as Japanese words and a large number of items. Examples of such keyboard apparatus are disclosed in U.S. Pat. No. 4,136,336 titled "KEYBOARD APPARATUS" issued Jan. 23, 1979 and U.S. Pat. No. 4,492,818 titled "TABLET INPUT APPARATUS" issued Jan. 8, 1985, owned by the assignee of the present invention.

In the case where a capacitive coupling tablet is applied as a figure input apparatus, a conductor matrix of the tablet is desired to have a density as high as possible in order to obtain a high resolution. However, this involves various difficulties in terms of manufacture, and normally, the conductors of each group are arranged in a spaced relation of 3-6 mm. Such a tablet is disclosed, for example, in U.S. Pat. No. 4,677,259 titled "POSITION DETERMINATION DEVICE" issued June 30, 1987 and owned by the assignee of the present invention. A method for digitalizing in interpolation a coordinate position of a probe placed in a gas zone between conductors is proposed, for example, in U.S. Pat. No. 4,616,107 titled "PATTERN INPUT APPARATUS" issued Oct. 7, 1986. However, in many cases, a coordinate position on the tablet is formed into a digital signal by arithmetic operation which appraises a level of a pulse detected from a few conductors adjacent to the coordinate position. However, for producing an accurate positional signal, the level of the pulse detected from the conductors adjacent to each other has to be in correct inverse proportion to the distance between each conductor and a probe.

Known probes in cooperation with a tablet include a pen type, a cursor type or a mouth type. An example of a cursor device used along with a capacitive coupling tablet is shown in FIGS. 1 and 2 of the accompanying drawings. This cursor device 1 has a housing 3 made of synthetic resin which is manually moved along the surface of a tablet 20, the housing 3 having a window 2 which indicates a coordinate position to be input on the tablet. The window 2 has a pane 8 formed of a transparent dielectric material mounted thereon. A cross index 5 is provided on the pane 8. The pane 8 is arranged spaced apart from the surface of the tablet 20, and a detection electrode 6 corresponding to the cross index 5 is supported on the surface opposed to the tablet 20. A signal transmission wire 9 is connected to the electrode 6, and the wire 9 sends a detection signal to an amplifier (not shown) mounted within the housing 3. Upon operation of a switch 7 provided on the housing 3, an output signal of the amplifier is sent to a control unit (not shown) through an output wire 4 extending outwardly from the housing 3. The signal transmission wire 9 normally comprises a shield wire having a covering of conductor material so as not to be affected by external noises. It has been found however that the use of this shield wire exerts an unexpected bad influence in that appropriate capacitive coupling between each conductor of the tablet and the detection electrode is impeded, and the pulse of a level in inverse proportion to the distance between the each conductor of the tablet and the electrode fails to be obtained.

FIG. 3 illustrates by a diagram the state of a capacitive coupling of a tablet and a cursor. One group of conductors in the tablet is indicated by reference symbols K1 and K5. The cursor device placed on the tablet is indicated by a detection electrode 6 and a shield wire 9. When the group of conductors K1 and K5 of the tablet is sequentially energized pulsewise, these conductors and the detection electrode 6 are capacitively coupled, and signals S1 to S5 passing through a route which is the shortest from the conductors are transmitted to the detection electrode 6. In this case, the conductors K4 and K5 present at a position crossed to the shield wire 9 are capacitively coupled to the shield wire 9, and leak signal S4' and S5' flow from the conductors into a grounding conductor 14 through a conductor covering 13 of the shield wire 9. For this reason, the level of the pulses detected from the conductors K4 and K5 crossed to the shield wire 9 is relatively lower with respect to the level of the pulses detected from the other conductors K1, K2 and K3, thus failing to obtain the pulse of the level in inverse proportion to the distance between the conductors K1 to K5 and the detection electrode 6. What we particularly wish to call attention to is that if such unbalanced relationship is constant, it can be electrically corrected in accordance with timing of successive pulses for energizing conductors but the degree of unbalance varies with orientation of the cursor device on the tablet and therefore, it becomes very difficult. That is referring to FIGS. 4a and 4b, which show an orientation of the cursor device as viewed from the surface of the tablet, when leak signals S4' and S5' from the conductors K4 and K5 in the case where the shield wire 9 is placed perpendicularly to the group of conductors K1 to K5 are compared with leak signals S4" and S5" from the conductors K4 and K5 in the case where the shield wire 9 is placed obliquely to the group of conductors K1 to K5, the case of the latter is small in the leak signal, and thus the amount of attenuation of the pulse obtained in the detection electrode 6 from the conductors K4 and K5 becomes relatively smaller than that of the former.

SUMMARY OF THE INVENTION

It is general object of the present invention to provide a cursor device for a capacitive coupling tablet which when a suitable coordinate position on a tablet is indicated, can produce a digital signal accurately representative of the indicated coordinate position.

It is a particular object of the present invention to provide a cursor device for a capacitive coupling tablet which can capacitively couple with some conductors within the tablet to detect a pulse of a level in inverse proportion to the distance from said conductors.

According to the present invention, there is provided a cursor device used together with a capacitive coupling tablet, comprising two groups of conductors arranged in a two-dimensional matrix fashion in a spaced apart relation, each group of conductors being sequentially energized pulsewise, the improvement wherein said device comprises a housing manually moved on the tablet, said housing having a window including a pane formed of a dielectric material having an index which indicates a coordinate position to be input on said tablet, said pane carrying a detection electrode corresponding to said index and a signal transmission wire extending from said electrode, said pane including a shield layer formed of a conductive material distributed around said electrode, said shield layer being grounded.

DESCRIPTION OF THE PREFERRED EMBODIMENTS

Figure 1:
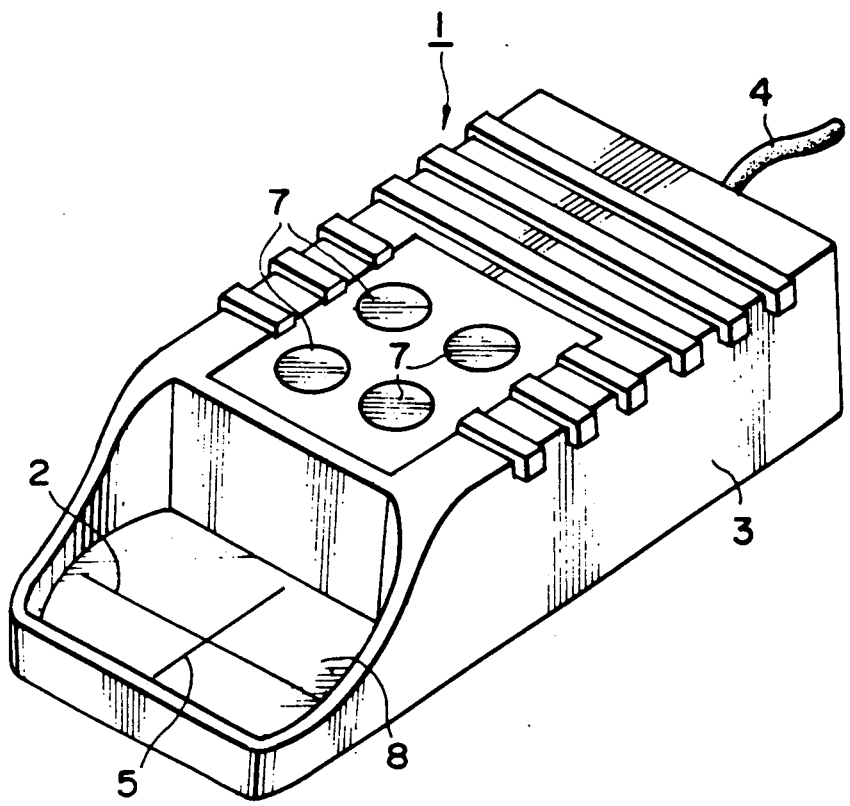
FIG. 1 is a perspective view of a cursor device for a capacitive coupling tablet.
Figure 2:
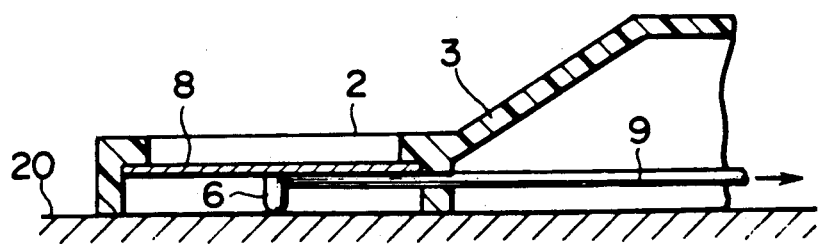
FIG. 2 is a partial sectional view of a conventional cursor device.
Figure 3:
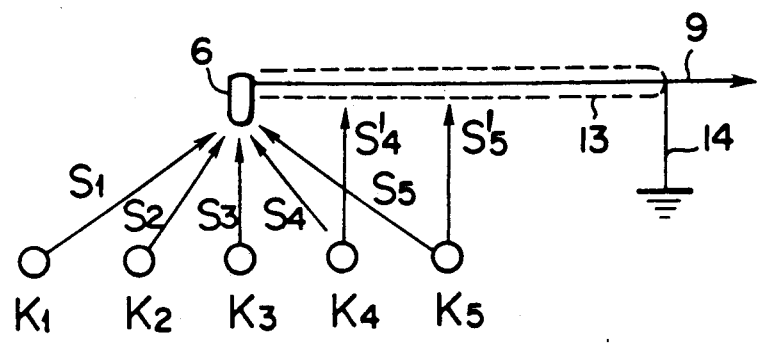
FIG. 3 is an explanatory view of the state of capacitive coupling between the cursor device and the tablet shown in FIG. 2.
Figure 4A:
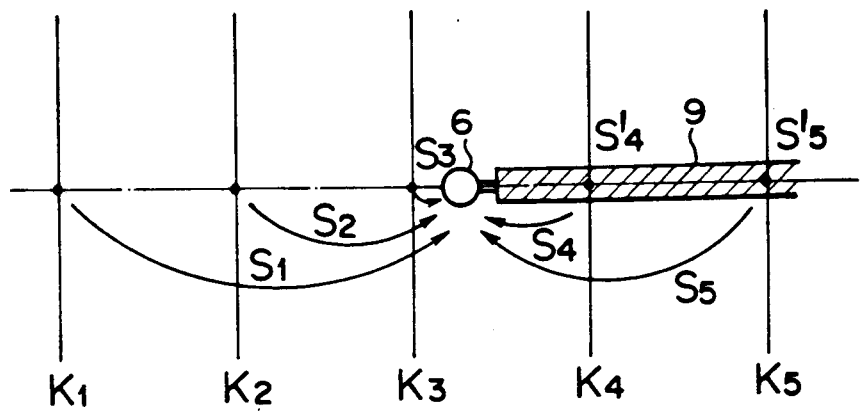
FIGS. 4a and 4b are explanatory views, respectively, showing the orientation of a cursor device on the tablet.
Figure 4B:
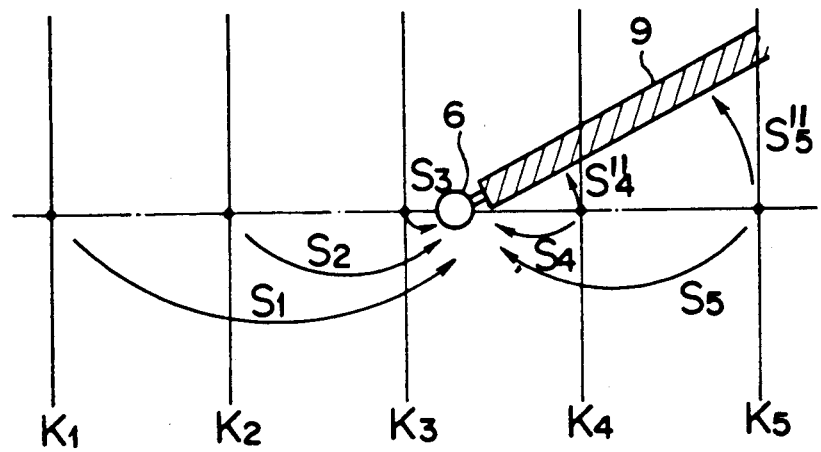
Figure 5:
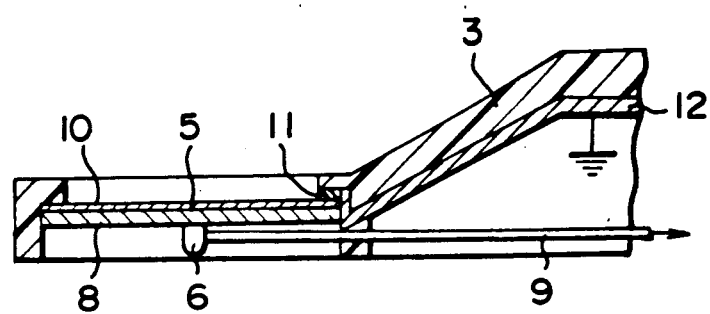
FIG. 5 is a partial sectional view of a cursor device according to the present invention.

Referring to FIG. 5, there is shown a cursor device according to the present invention in the form of a partial sectional view similar to that of the prior art shown in FIG. 2. In FIG. 5, the same parts as those of the prior art are indicated by the same reference numerals as those used in the prior art. A pane 8 formed from a transparent synthetic resin panel is mounted on a window 2 (FIG. 2) formed in a housing 3, and an index 5 is displayed on the pane 8. This cursor device 1 is used in such a manner that the housing 3 is manually moved on the tablet, and in this case, the index 5 of the window 2 formed on the housing 3 is placed in coincidence with a coordinate position to be input on the tablet, and then a switch 7 (FIG. 1) on the housing 3 is operated. The pane 8 carries on the underside thereof a detection electrode 6 corresponding to the index 5 on the pane and a signal transmission wire 9 extending from said electrode 6. The signal transmission wire 9 comprises a shield wire having a covering 13 formed of a conductive materials, the covering 13 being connected to a grounding wire 14.

According to the present invention, above the pane 8 is formed a conductive layer 10 formed of a transparent conductive material, the conductive layer 10 being connected to a lining 12 formed of a conductive material formed internally of the housing 3 through a conductive rubber 11. This lining 12 is also connected to the grounding wire 14 like the covering 13 of the shield wire 9. In the illustrated embodiment, the conductive layer 10 is formed over the whole surface of the pane 8 but it is noted that the conductive layer 10 can be formed by attaching a transparent conductive sheet to the pane 8. Furthermore, the lining 12 formed of a conductive material of the housing 3 can be formed by vapor deposition.

Figure 6:
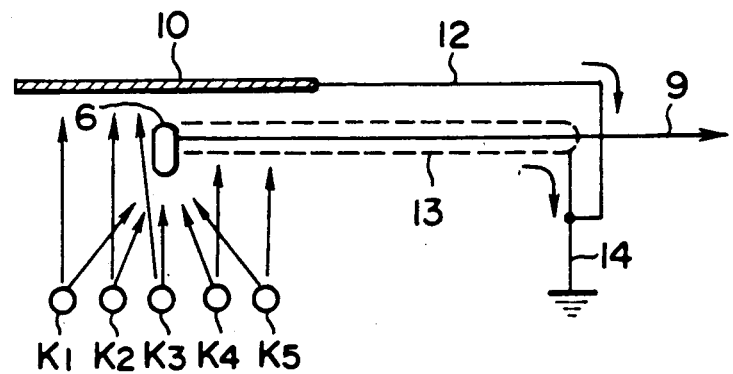
FIG. 6 is an explanatory view showing the state of capacitive coupling between the cursor device and the tablet shown in FIG. 5.

Referring to FIG. 6, it is apparent that in the cursor device according to the present invention, a group of conductors K1 to K5 of the tablet is capacitively coupled to the detection electrode 6 whereas said group of conductors is also capacitively coupled to the conductive layer 10. In this case, the conductors K4 and K5 present at a position crossed to the shield wire 9 are also capacitively coupled to the shield wire 9 similarly to the prior art. But the spacing between the shield wire 9 and the conductive layer 10 is a very small distance corresponding to the thickness of the pane 8, and since the ratio of an area occupied by the conductive layer 10 is much greater than that of the shield wire 9, the relative amount of attenuation with respect to the other conductors K1, K2 and K3 can be almost ignored. Since the attenuation of a pulse received from the specific conductor may be ignored, the detection electrode 6 is able to receive, from the conductors K1 to K5, pulses having a level in inverse proportion to the magnitude of the distance between the conductors irrespective of the orientation of the cursor device on the tablet.

While in the above description, capacitive coupling between one group of conductors K1 to K5 of the tablet constituting a conductor matrix and the detection electrode 6 has been mentioned, it will be apparent that exactly the same manner is applied to capacitive coupling between the other group of conductors and the detection electrode 6.

What is claimed is:

1. A cursor device for use with a capacitive coupling tablet including therein two groups of conductors arranged spaced apart in a two-dimensional matrix, each group of the conductors being sequentially energized pulsewise, the cursor device comprising:
   a housing manually movable on the tablet and having a window opposable to the tablet;
   a transparent dielectric pane fitted in the window and having an index formed thereon for indicating a coordinate position on the tablet;
   an electrode disposed under the pane at a position just under the index for detecting pulse signals from the conductors in the tablet through capacitive coupling with the conductors;
   a shielded wire extending under the pane from the electrode for transmitting the signals detected by the electrode, a shielding part of the shielded wire being grounded; and
   a transparent conductive layer formed on the pane to evenly cover the electrode and its surrounding region for capacitively coupling with tablet conductors around the electrode, the conductive layer being grounded.

2. A cursor device according to claim 1, wherein the housing has a lining formed of a conductive material, and the transparent conductive layer on the pane is connected to the lining through a conductive rubber and grounded through the lining.

3. A cursor device according to claim 1, wherein the transparent dielectric pane comprises a transparent synthetic resin panel, and the transparent conductive layer comprises a transparent conductive sheet attached onto the panel.

4. A cursor device for indicating a coordinate position on a tablet having therein a two-dimensional matrix of conductors sequentially energized pulsewise, said cursor device comprising:
- an electrode for receiving pulse signals from the energized conductors through capacitive coupling with the conductors to indicate a coordinate position on the tablet;
- a shielded wire extending from the electrode for transmitting the pulse signals received by the electrode to an amplifier, a shielding part of the shielded wire being grounded;
- a transparent dielectric plate disposed over the electrode and the shielded wire in the vicinity of the electrode and having an index thereon for indicating a position of the electrode thereunder; and
- a transparent conductive layer formed on the upper surface of the plate and being grounded for capacitively coupling with the tablet conductors around the electrode, the conductive layer being distributed so as to evenly cover the electrode and its surrounding region.

5. A cursor device according to claim 4, wherein the transparent conductive layer comprises a transparent conductive sheet attached onto the transparent dielectric plate.

6. A cursor device according to claim 4, wherein the transparent dielectric plate comprises a transparent synthetic resin panel.

7. A cursor device according to claim 4, wherein the transparent conductive layer has a distribution area sufficient to cover thereunder five successive parallel tablet conductors.

8. A cursor device for use on a tablet having a matrix of tablet conductors energized by sequential pulses, comprising:
- a housing manually movable on a tablet and having an opening therein over the tablet during use;
- a transparent dielectric member in the opening and having indicia thereon to define a coordinate position; and
- capacitive coupling means for detecting pulses from the tablet conductors comprising an electrode disposed under the transparent member at said coordinate position; a shielded wire extending under the transparent dielectric member from the electrode and having a grounded shield, and a transparent conductive layer disposed over the transparent dielectric member, said transparent conductive layer being grounded and being of sufficient area to at least cover said electrode and the tablet conductors located in the region near and around said electrode during use of the cursor device.

9. A cursor device according to claim 8, wherein the housing has a lining composed of conductive material which is grounded and conductive rubber connecting the transparent conductive layer to the lining.

10. A cursor device according to claim 8, wherein the transparent dielectric member comprises a transparent synthetic resin panel, and the transparent conductive layer comprises a transparent conductive sheet attached onto the panel.

11. A cursor device according to claim 8, wherein the area of the transparent conductive layer is substantially greater than the area of the shielded wire under the transparent dielectric member.

12. A cursor device according to claim 11, wherein the transparent conductive layer covers the shielded wire along its entire length under the transparent dielectric member.

13. In a cursor device for use on a tablet having a matrix of tablet conductors energized by sequential pulses, the improvement comprising:
- a transparent dielectric member facing the tablet during use and having indicia thereon to define a coordinate position; and
- capacitive coupling means for detecting pulses from the tablet conductors comprising a conductive means disposed under the transparent member at said coordinate position, a shielded conductor extending under the transparent dielectric member from the conductive means and having a grounded shield, and a transparent conductive layer disposed over the transparent dielectric member, said transparent conductive layer being grounded and being of sufficient area to at least cover said conductive means and the tablet conductors located in the region near and around said conductive means during use of the cursor device.

14. A cursor device according to claim 13, wherein the transparent conductive layer comprises a transparent conductive sheet attached onto the transparent dielectric member.

15. A cursor device according to claim 13, wherein the transparent dielectric member comprises a transparent synthetic resin panel.

16. A cursor device according to claim 13, wherein the transparent conductive layer has sufficient area to cover five adjacent tablet conductors.

17. A cursor device according to claim 13, wherein the area of the transparent conductive layer is substantially greater than the area of the shielded conductor under the transparent dielectric member.

18. A cursor device according to claim 17, wherein the transparent conductive member covers the shielded conductor along its entire length under the transparent dielectric member.

* * * * *